US007429991B2

(12) United States Patent
Liu et al.

(10) Patent No.: US 7,429,991 B2
(45) Date of Patent: Sep. 30, 2008

(54) VIDEO CARD

(75) Inventors: Yi-Li Liu, Sijhih (TW); Sun-Chung Chen, Sijhih (TW)

(73) Assignee: Aten International Co., Ltd., Taipei County (TW)

( * ) Notice: Subject to any disclaimer, the term of this patent is extended or adjusted under 35 U.S.C. 154(b) by 324 days.

(21) Appl. No.: 11/142,513

(22) Filed: Jun. 1, 2005

(65) Prior Publication Data

US 2005/0270296 A1 Dec. 8, 2005

(30) Foreign Application Priority Data

Jun. 4, 2004 (TW) .............................. 93116246 A

(51) Int. Cl.
*G06F 13/14* (2006.01)

(52) U.S. Cl. ...................................................... 345/520

(58) Field of Classification Search ................. 345/204, 345/520

See application file for complete search history.

(56) References Cited

U.S. PATENT DOCUMENTS 6,633,905 B1 10/2003 Anderson et al.
6,672,896 B1 1/2004 Li
2002/0135605 A1* 9/2002 Kim ........................... 345/698
2002/0158814 A1* 10/2002 Bright et al. .................... 345/7
2003/0117382 A1* 6/2003 Pawlowski et al. .......... 345/204
2005/0283563 A1* 12/2005 Lou et al. ................... 710/316

OTHER PUBLICATIONS

"Agilent N2523A Remote Management Card 3.0" Print Day May 13, 2003, 5988-8687EN.
"Agilent N2523A Remote Management Processor 3.0" Print Day May 27, 2003, 5988-8686EN.

* cited by examiner

*Primary Examiner*—Kee M. Tung
*Assistant Examiner*—Jacinta Crawford
(74) *Attorney, Agent, or Firm*—Thomas, Kayden, Horstemeyer & Risley

(57) ABSTRACT

A video card is controlled by a control unit to output video data to a display or through a network. The video card includes a network interface, an interface controller and a bus interface. The network interface is connected to the network to transfer the video data. The interface controller is coupled to the network interface and controlled by the control unit to output the video data to the display or through the network interface. The bus interface is coupled between the interface controller and the control unit and is for inputting the video data from the control unit to the interface controller.

16 Claims, 2 Drawing Sheets

VIDEO CARD

This application claims the benefit of Taiwan application Serial No. 93116246, filed Jun. 4, 2004, the subject matter of which is incorporated herein by reference.

BACKGROUND OF THE INVENTION

1. Field of the Invention

The invention relates in general to a video card, and more particularly to a video card with a keyboard/video/mouse over IP (KVM over IP) function.

2. Description of the Related Art

The video card functions to control the graphic output of the computer. The video card has to be mounted to the computer mainboard and connected to the display such that the display can display the data. So, the video card may be regarded as a data transmission interface between the computer host and the display. The function of the video card often determines the display quality of the display.

In addition, the KVM over IP technology provides the function of controlling multiple local computers by a remote computer through the network. FIG. 1 is a block diagram showing the structure of a conventional KVM-over-IP-device connected to a video card to transfer data. The video card 100 includes a PCI (Peripheral Component Interface) or AGP (Accelerated Graphics Port) (PCI/AGP) controller 102, a PCI/AGP bus interface 104, a video memory 106 and a D/A converter (Digital-to-Analog Converter) 108. The control unit 101 transfers the video data Dv to the controller 102 through the bus interface 104. The controller 102 computes (processes) the video data Dv and then stores the processed data into the video memory 106. The D/A converter 108 converts the video data Dv into analog data Da, which is inputted to the KVM-over-IP-device 120 and then outputted to the display 109 for display.

Furthermore, the KVM-over-IP-device 120 includes an interface controller 122, a keyboard/mouse interface 123, a CPU (Central Processing Unit) 124, an A/D (Analog-to-Digital) converter 126 and a network interface 128. When the KVM-over-IP-device 120 is in a local mode, the keyboard/mouse data Dkm outputted by the keyboard/mouse console 121 is transferred to a keyboard/mouse port 125 of the local computer through the keyboard/mouse interface 123 in order to control the local computer. When the KVM-over-IP-device 120 is in the network mode, the remote computer 129 utilizes window client or Java client or browser software to control the local computer connected to the KVM-over-IP-device 120 through the operation of the keyboard/mouse and the network 127.

When the control unit 101 wants to transfer the video data Dv to the remote computer 129 through the network 127 using the KVM-over-IP-device 120, the video data Dv has to be converted into the analog data Da using the D/A converter 108, and then converted into the digital data Dd using the A/D converter 126. The digital data Dd is processed by the interface controller 122 and the CPU 124, and then outputted to the remote computer 129 through the network interface 128.

As mentioned above, the video card 100 has to use the D/A converter 108 and the A/D converter 126 in order to transfer the video data Dv to the remote computer 129 through the KVM-over-IP-device 120. Because the data error tends to be caused during the converting processes of the D/A converter 108 and the A/D converter 126, the precision of the data transmission is deteriorated, the transmission speed is reduced, and the manufacturing cost is thus increased.

SUMMARY OF THE INVENTION

It is therefore an object of the invention to provide a video card capable of outputting the received digital video data to the remote computer directly through the network with the reduced number of the above-mentioned D/A and A/D converting processes, wherein the remote computer can control the local computer through the network and the video card and thus provide the KVM-over-IP function.

The invention achieves the above-identified object by providing a video card, which is controlled by a control unit to output video data to a display or through a network. The video card includes a network interface, an interface controller and a bus interface. The network interface is connected to the network to transfer the video data. The interface controller is coupled to the network interface and controlled by the control unit to output the video data to the display or through the network interface. The bus interface is coupled between the interface controller and the control unit and is for inputting the video data from the control unit to the interface controller.

The video card further includes a video memory, which is connected to the interface controller and for storing the video data. The video card further includes a D/A converter, which is connected between the interface controller and the display and for converting the video data into the analog signal to be outputted to the display. The video card further includes a CPU, which is coupled between the network interface and the interface controller and for computing (processing) and compressing the video data and then outputting the video data through the network. The video card further includes a controller, which is coupled between the interface controller and the bus interface and for computing (processing) the video data.

The video card further includes a keyboard/mouse interface connected to an interface controller and to be connected to a local computer and a keyboard/mouse console. When the video card is in a network mode, a remote device utilizes window client, Java client or browser software to control the local computer through the network and the video card according to an operation of a keyboard/mouse, and the video card is controlled by the remote device to output the video data to the remote device for display. When the video card is in a local mode, the keyboard/mouse console outputs keyboard/mouse data to a keyboard/mouse port of the local computer through the keyboard/mouse interface. The video card further includes a DVI (Digital Visual Interface), which is connected to the interface controller and for receiving DVI video data. In addition, the interface controller outputs the DVI video data to the display or outputs the DVI video data through the network.

Using the above-mentioned circuit structure, the video card of the invention can reduce the number of A/D and D/A converters, reduce the data conversion error, increase the data transmission rate and reduce the cost.

Other objects, features, and advantages of the invention will become apparent from the following detailed description of the preferred but non-limiting embodiments. The following description is made with reference to the accompanying drawings.

DETAILED DESCRIPTION OF THE INVENTION

The main feature of a video card of the invention will be described in the following. The video card can accept the control of the control unit to process the video data and then output the data to the display. In addition, the video card can further utilize the KVM switch function to transfer the video data to the remote computer through the network, and the remote computer also can control the local computer through the network and the video card. Because the digital data can be directly processed, the number of the above-mentioned D/A and A/D conversion procedures can be reduced, the data transmission precision can be improved, the transmission rate can be increased, and the manufacturing cost can be reduced.

Figure 1:
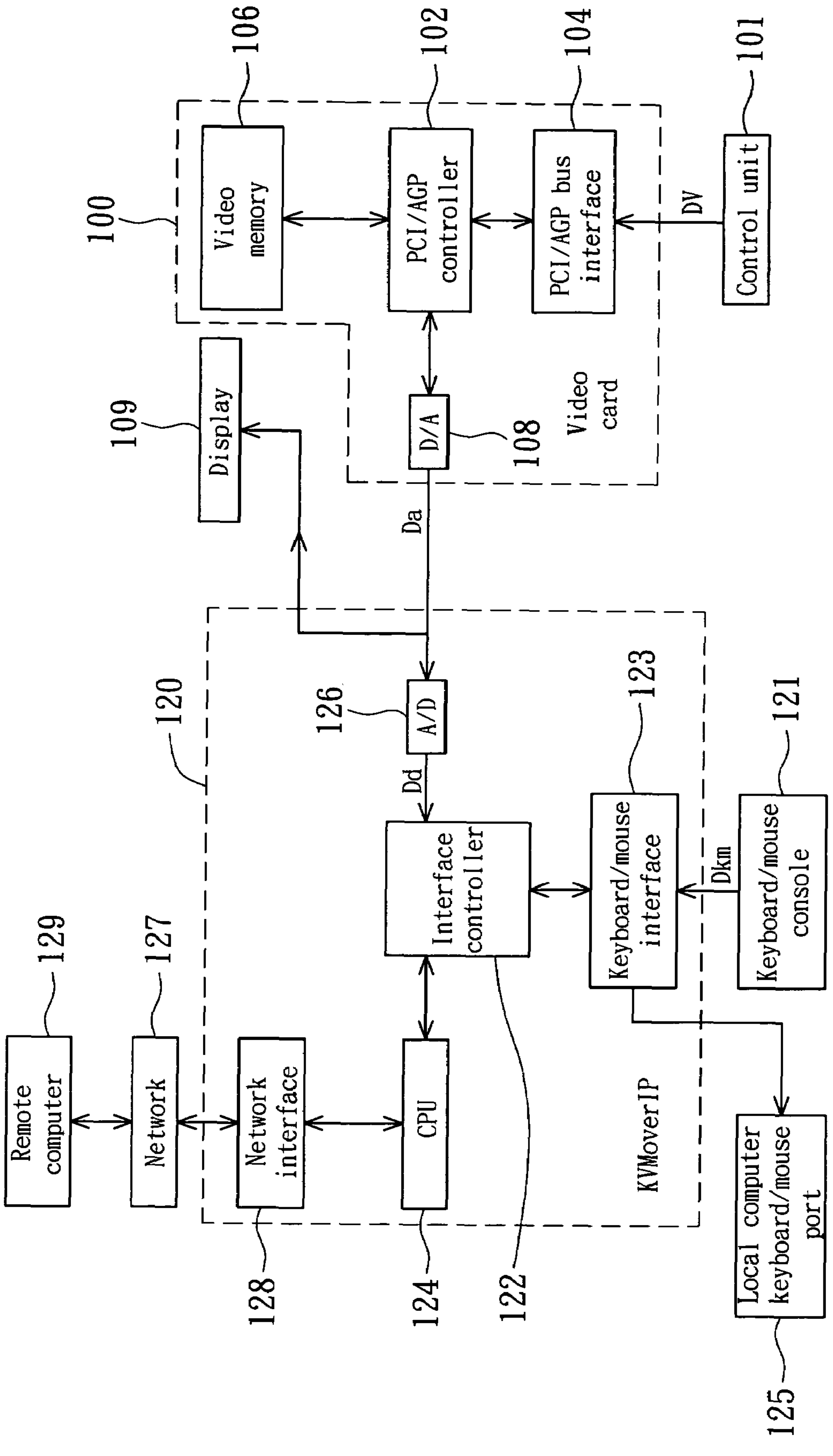
FIG. 1(PRIOR ART)
FIG. 1 is a block diagram showing the structure of a conventional KVM-over-IP-device connected to a video card to transfer data.
Figure 2:
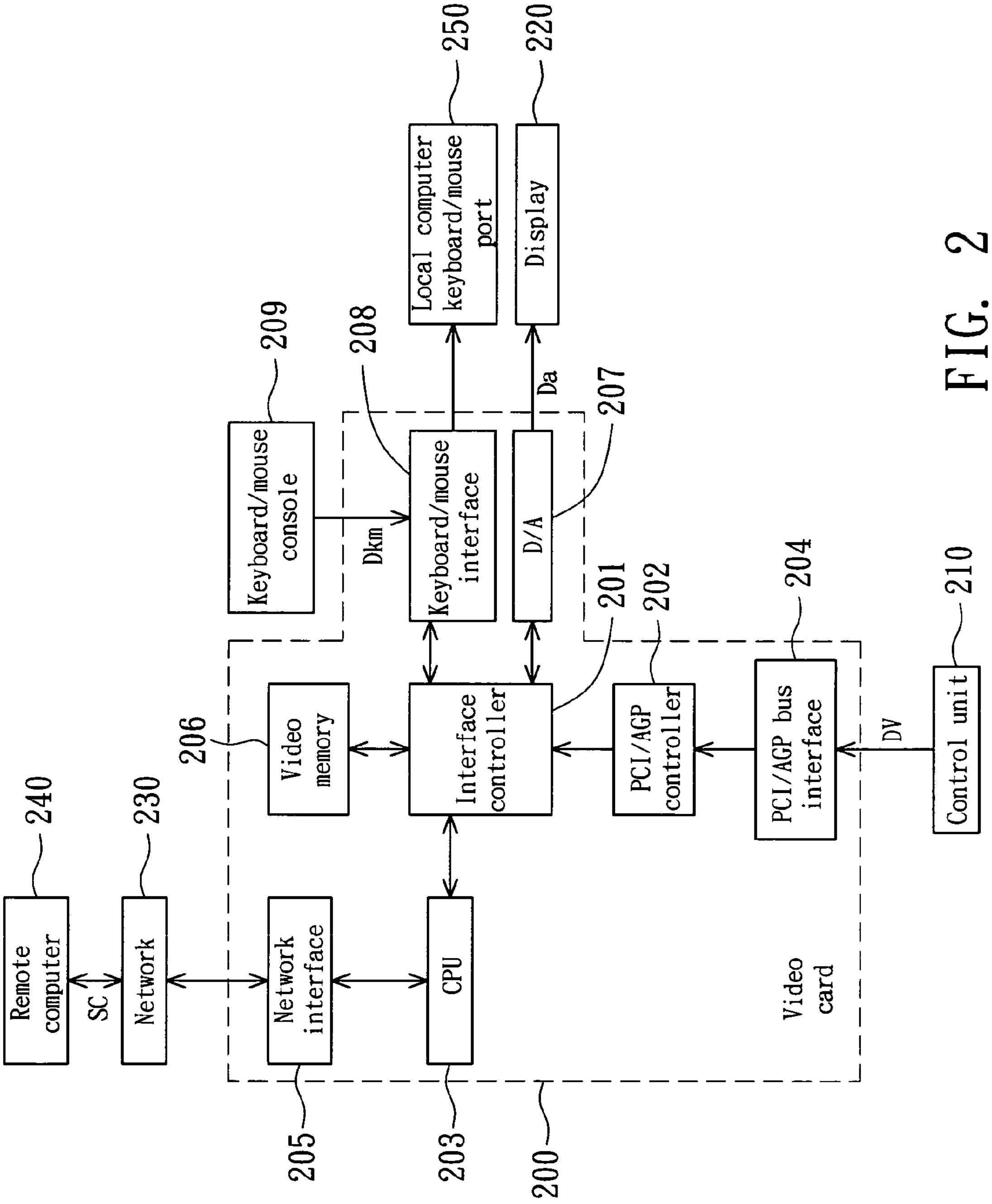
FIG. 2 is a block diagram showing the structure of a video card according to a preferred embodiment of the invention.

FIG. 2 is a block diagram showing the structure of a video card according to a preferred embodiment of the invention. Referring to FIG. 2, the video card 200 includes an interface controller 201, a PCI (or AGP) controller 202, a CPU 203, a PCI (or AGP) bus interface 204, a network interface 205, a video memory 206, a D/A converter 207 and a keyboard/mouse interface 208. The video card 200 accepts the control of the control unit 210 of the control computer (not shown) to output the video data Dv to the display 220 or output the data through the network 230. The network interface 205 is connected to the network 230 to transfer the video data Dv. The CPU 203 is coupled to the network interface 205 to encode and compress the video data Dv.

The interface controller 201, such as a FPGA (Field Programmable Gate Array) controller, is coupled to the CPU 203 to receive the control of the control unit 210 and output the video data Dv to the display 220. Alternatively, the video data Dv is encoded and compressed by at least one of the interface controller 201 and the CPU 203, and then outputted to the remote computer 240 through the network interface 205. The bus interface is coupled to the control unit 210 and for inputting the video data Dv from the control unit 210 to the interface controller 201. The controller 202 is coupled between the interface controller 201 and the bus interface 204, and for computing the video data Dv.

The video memory 206 is connected to the interface controller 201 and for storing the video data Dv. The keyboard/mouse interface 208 is connected to the interface controller 201 and is to be connected to an external keyboard/mouse console 209. When the video card 200 is in a network mode (IP mode), the video card 200 transfers the encoded and compressed signal Sc between the network 230 and the remote computer 240. The encoded and compressed signal Sc may be, for example, the encoded and compressed video data Dv, which is outputted to the remote computer 240 for display through the network. The encoded and compressed signal Sc may be, for example, a keyboard/mouse signal. The remote computer 240 utilizes window client, Java client or browser software to output the keyboard/mouse signal according to the operation of the keyboard/mouse. The keyboard/mouse signal is outputted to the keyboard/mouse port 250 of the local computer through the network 230, the network interface 205, the CPU 203, interface controller 201 and the keyboard/mouse interface 208 in order to control the local computer. In addition, the encoded and compressed signal Sc also may be a keyboard LED state signal of the local computer, and the keyboard LED state signal is outputted to the remote computer 240 to update the LED state of the remote computer 240 synchronously. The encoded and compressed signal Sc may be other commands and data signals. When the video card 200 is in a local mode (direct mode), the keyboard/mouse console 209 outputs the keyboard/mouse data Dkm to the keyboard/mouse port 250 of the local computer through the keyboard/mouse interface 208.

In addition, the video card of the invention can be connected to a remote computer, a specific digital terminal or host through the network, accept the operation and control of the keyboard/mouse of the specific digital terminal or host, and output a display signal to the specific digital terminal or host.

As mentioned above, the control unit 210 can control the interface controller 201 of the video card 200 to convert the video data Dv into the analog data Da through the D/A converter 207, and then output the analog data Da to the display 220 for display. Alternatively, the control unit 210 also can directly transfer the digital video data Dv from the controller 202 to the interface controller 201. The digital video data Dv is processed and compressed by the interface controller 201 and the CPU 203, and then outputted to the remote computer 240 through the network 230. Therefore, the number of the above-mentioned additional D/A and A/D converting processes may be reduced. So, the video card 200 of the invention can control the video data Dv to be outputted to the local display 220 and also to be transferred through the network 230, and the errors caused by the data conversion may be reduced.

The video card 200 may further includes a DVI (Digital Visual Interface), which is connected to the interface controller (not shown) 201 and for receiving DVI video data. The interface controller 201 outputs the DVI video data to the display 220, or the video data is encoded and compressed by at least one of the interface controller 201 and the CPU 203 and then outputted through the network 230.

The video card according to the preferred embodiment of the invention has the following advantages.

1. The video card can accept the control of the control unit to process the video data and output the processed data to the display. Also, the video card can encode and compress the video data, and output the encoded and compressed data to the remote computer through the network. Then, the encoded and compressed data is decoded and decompressed and then outputted to the display of the remote computer without any redundant A/D and D/A procedures. Thus, it is possible to reduce the data conversion error, increase the data transmission rate, and reduce the cost.

2. The video card can accept the control of the keyboard/mouse console through the keyboard/mouse interface so as to transfer the keyboard/mouse data to the local computer in a local mode, or to accept the operation control of the remote computer keyboard/mouse in the network mode in order to input the keyboard/mouse signal to control the local computer and to perform the operation of the KVM over IP function. So, the application variety of the video card may be increased.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video card controlled by a control unit to output video data to a display in a local mode or to output the video data through a network in a network mode, the video card comprising:

a network interface connected to the network to transfer the video data;

an interface controller coupled to the network interface, wherein the interface controller is controlled by the control unit to output the video data to the display from the video card when the video card is in the local mode and to output the video data through the network interface from the video card when the video card is in the network mode;

a bus interface, which is coupled between the interface controller and the control unit, for inputting the video data from the control unit to the interface controller;

a video memory connected to the interface controller, for storing the video data;

a CPU (Central Processing Unit) coupled between the network interface and the interface controller, for computing and compressing the video data;

a first controller coupled between the interface controller and the bus interface, for computing the video data; and a keyboard/mouse interface connected to the interface controller, a local computer and a keyboard/mouse console.

2. The video card according to claim 1, further comprising a D/A converter (Digital-to-Analog Converter), which is coupled between the interface controller and the display and for converting the video data into an analog signal to be outputted to the display.

3. The video card according to claim 1, wherein the video data is encoded and compressed by at least one of the interface controller and the CPU and then outputted through the network interface.

4. The video card according to claim 1, wherein the bus interface is a PCI (Peripheral Component Interface).

5. The video card according to claim 4, wherein the first controller is a PCI controller.

6. The video card according to claim 1, wherein the bus interface is an AGP (Accelerated Graphics Port).

7. The video card according to claim 6, wherein the first controller is an AGP controller.

8. The video card according to claim 1, wherein the keyboard/mouse console outputs a keyboard/mouse signal to control the local computer through the keyboard/mouse interface.

9. The video card according to claim 1, wherein when the video card is in a network mode, a remote device utilizes window client, Java client or browser software to control the local computer through the network and the video card according to an operation of a keyboard/mouse, and the video card is controlled by the remote device to encode and compress the video data and then output the encoded and compressed video data to the remote device for display.

10. The video card according to claim 9, wherein the remote device is a remote computer.

11. The video card according to claim 10, wherein the local computer outputs a keyboard LED state signal to a remote computer in order to update a LED state of the remote computer synchronously.

12. The video card according to claim 9, wherein the remote device is a digital terminal or a host.

13. The video card according to claim 1, wherein when the video card is in a local mode, the keyboard/mouse console outputs keyboard/mouse data to a keyboard/mouse port of the local computer through the keyboard/mouse interface.

14. The video card according to claim 1, wherein the interface controller is a FPGA (Field Programmable Gate Array) controller.

15. The video card according to claim 1, further comprising a DVI (Digital Visual Interface), which is connected to the interface controller and for receiving DVI video data.

16. The video card according to claim 15, wherein the interface controller outputs the DVI video data to the display or outputs the DVI video data through the network.

* * * * *